United States Patent
Chang

(10) Patent No.: US 9,690,069 B2
(45) Date of Patent: *Jun. 27, 2017

(54) CABLE GUIDE FOR FIBER OPTIC CABLES

(71) Applicant: Senko Advanced Components, Inc., Marlboro, MA (US)

(72) Inventor: Jimmy Jun-Fu Chang, Worcester, MA (US)

(73) Assignee: Senko Advanced Components, Inc., Malborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,848

(22) Filed: Jun. 6, 2016

(65) Prior Publication Data

US 2016/0282577 A1 Sep. 29, 2016

Related U.S. Application Data

(63) Continuation of application No. 13/900,520, filed on May 22, 2013, now Pat. No. 9,360,649.

(51) Int. Cl.
*G02B 6/44* (2006.01)

(52) U.S. Cl.
CPC ......... *G02B 6/4478* (2013.01); *G02B 6/4446* (2013.01); *G02B 6/445* (2013.01)

(58) Field of Classification Search
None
See application file for complete search history.

(56) References Cited

U.S. PATENT DOCUMENTS

| 6,634,801 B1 * | 10/2003 | Waldron | G02B 6/3887 |
| | | | 385/135 |
| 9,360,649 B2 * | 6/2016 | Chang | G02B 6/4478 |
| 2010/0247041 A1 * | 9/2010 | Szilagyi | G02B 6/3887 |
| | | | 385/86 |

* cited by examiner

*Primary Examiner* — Michelle R Connelly
(74) *Attorney, Agent, or Firm* — Pepper Hamilton LLP

(57) ABSTRACT

A fiber optic cable guide may have an elongated base member that is curved along at least a portion of its length to define and limit the amount of curvature to be applied to a portion of a fiber optic cable while also defining the angular offset applied to the cable. The guide may be releasably attachable to a cable, and may include a cable retention member at each end of the base member that retains the cable with the guide.

20 Claims, 10 Drawing Sheets

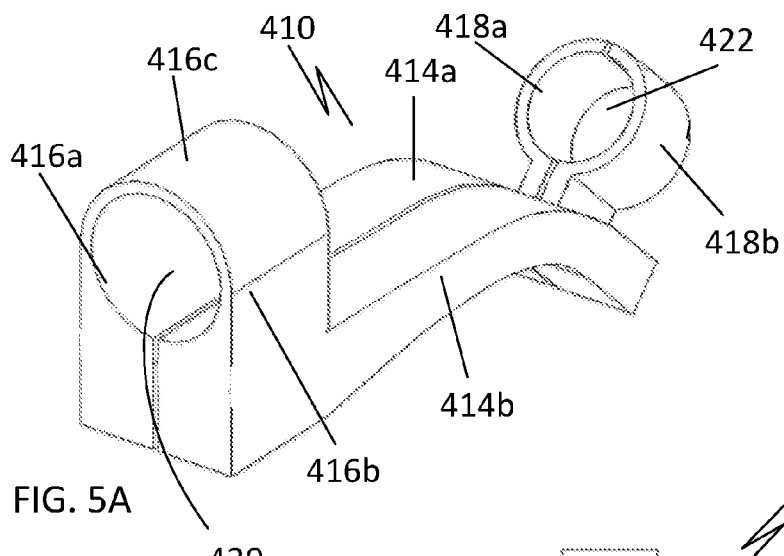
FIG. 5A
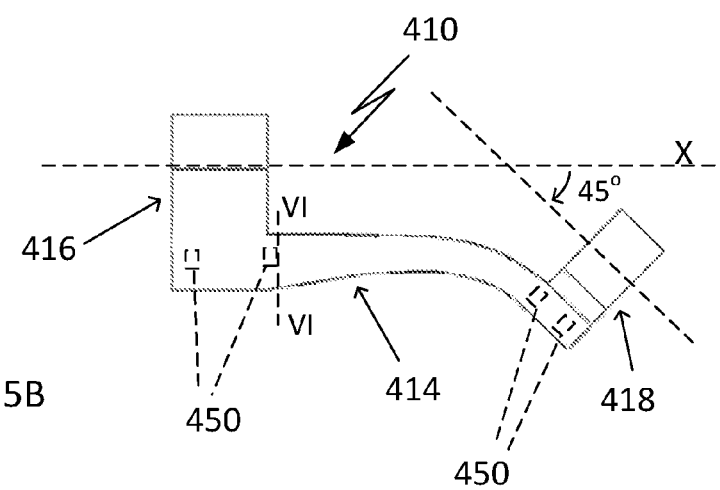
FIG. 5B
FIG. 6
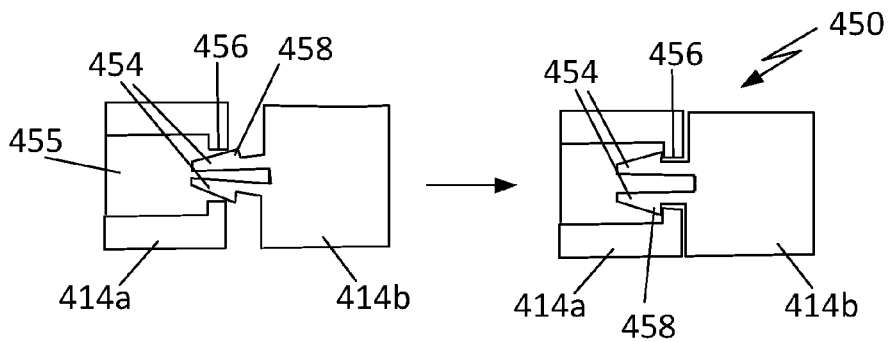

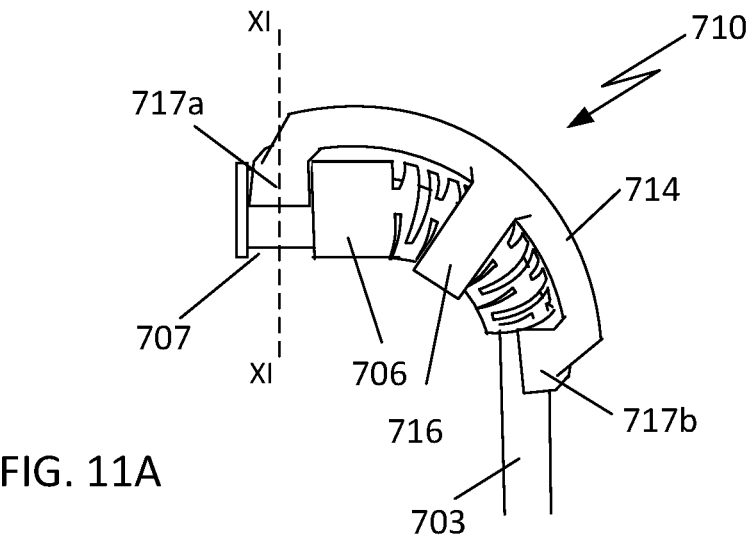
FIG. 11A
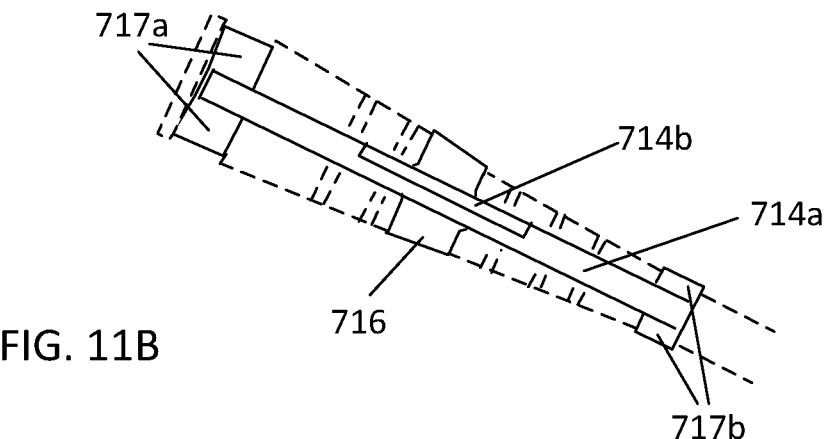
FIG. 11B
FIG. 11C
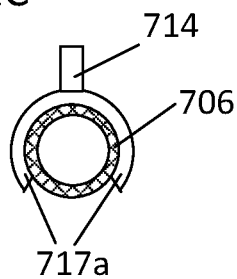

CABLE GUIDE FOR FIBER OPTIC CABLES

CROSS REFERENCE TO RELATED APPLICATIONS

This application is a continuation of U.S. patent application Ser. No. 13/900,520 filed May 22, 2013, which is incorporated herein by reference in its entirety.

BACKGROUND

As the use of optical fibers increases at a rapid rate, there is a corresponding increase in the number of fiber optic cables at any given installation. At a cable installation, fiber optic cables typically have terminal end portions that are mated in an enclosure, such as a patch panel, for example, that may include a panel wall that provides a juncture for incoming and outgoing cables. The panel wall may include connection sleeves, and a pair of fiber optic connectors may be inserted into the opposed ends of the fiber optic connector sleeve to align the fiber optic connectors to a degree such that the optical fibers upon which the fiber optic connectors are mounted are appropriately aligned with one another for transmission of a signal between the cables with minimal loss of signal.

The amount of space in an enclosure is generally limited and it may not be possible for the cables to extend linearly away from the panel wall in the plane of the connection. Further, in order to accommodate an increased number of cables, the cables may often need to be bent near the terminus through a radius of up to and including ninety degrees. Fiber optic cables however, have bending restraints, one of which is the minimum bend radius. If care is not taken when bending the cable, the bending of the cable may surpass the minimum bend radius of the optical fiber, and this could lead to attenuation, or even breakage of the optical fiber in the cable.

Cable guides can be used to provide and retain a fixed bend in an optical fiber cable to ensure that the cables are not bent beyond their minimal radius of curvature. Because of the confines of available space it is desirable that the guides be compact while also being functional to retain the cable securely within the guide. The guides should be easily attachable to the cable, and relatively easy to remove from a cable when no longer needed, or for reuse for another cable, for example. In addition, the guides should also be rotatable with the cable relative to the connection plane to allow the bent cables to be displaced and provide access to neighboring cables or connectors that may be underneath the bend.

There remains a need for an easy to use cable guide that satisfies the above requirements while providing for a desired bending of an optical fiber cable.

SUMMARY

A fiber optic cable guide may have an elongated base member that is curved along at least a portion of its length to define and limit the amount of curvature to be applied to a portion of a fiber optic cable while also defining the angular offset applied to the cable. The guide may be releasably attachable to a cable, and may include a cable retention member at each end of the base member that retains the cable with the guide.

In an embodiment a fiber optic cable guide includes an elongate support member for being disposed in a longitudinal direction of a fiber optic cable and configured for providing a radius of curvature to the fiber optic cable for changing a direction of the fiber optic cable, and a band having both a first end and a second end connected with the support member and configured to be disposed around the fiber optic cable to fasten the fiber optic cable to the support member.

In an embodiment, a fiber optic cable guide includes an elongate support member for being disposed in a longitudinal direction of a fiber optic cable and configured for providing a radius of curvature to the fiber optic cable for changing a direction of the fiber optic cable, the elongate support member comprises a first body portion interconnectable with a second body portion, and a flexible band having a first end connected with the first body portion and a second end connected with the second body portion, the flexible band being configured for being wrapped around the fiber optic cable to position the first body portion adjacent the second body portion for interconnection of the first body portion with the second body portion. At least one of the first body portion and the second body portion comprises at least one interlocking element for releasably interconnecting the first body portion with the second body portion, at least the first body portion, the second body portion, the flexible band and the at least one interlocking element are integrally formed.

BRIEF DESCRIPTION OF THE FIGURES

FIGS. 5A and 5B illustrate an alternative cable guide with a 45° offset according to an embodiment.

FIG. 6 illustrates an alternative interlocking mechanism according to an embodiment.

FIGS. 11A-11C depict an alternative cable guide according to an embodiment.

DETAILED DESCRIPTION

Figure 1:
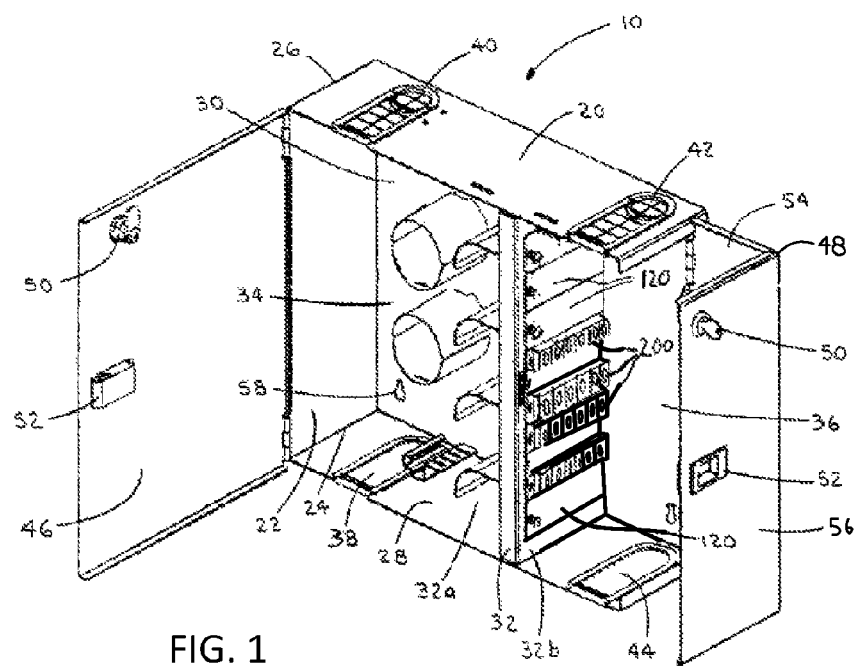
FIGS. 1 and 2 depict a representative panel box for fiber optic cable connections according to an embodiment.
Figure 2:
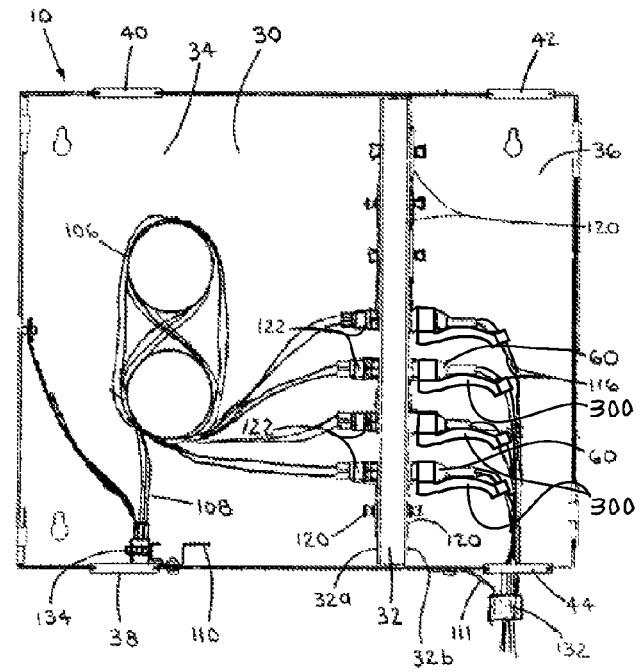

As shown in FIGS. 1 and 2, a fiber optic wall mount cabinet 10 may have a side wall 22 connected at a first end 24 to a bottom wall 28 and at a second end 26 to a top wall 20. A back wall 30 may be substantially perpendicular to edges of the top wall 20, the side wall 22, and the bottom wall 28 so that the side wall, bottom wall, top wall, and back wall form a substantially rectangular enclosure. The back wall 30 may include mounting features, such as key hole mounting slots 58 configured for allowing fastening of the cabinet 10 to a wall surface.

The cabinet may also have a patch panel wall 32 located within the cabinet for connecting fiber optic cable (108, 116 in FIG. 2). Such a patch panel wall 32 may extend between the top wall 20 and the bottom wall 28 and substantially parallel to the side wall 22. The patch panel wall 32 may divide the interior of the cabinet 10 into an incoming chamber 34 and an exiting chamber 36, thereby creating two surfaces, a first incoming surface 32a and a second exiting surface 32b. The cabinet 10 may have an arrangement of slots 38, 40, 42, 44 in the top wall 20 and the bottom wall 28 to route fiber optic cable into the incoming chamber 34 and out of exiting chamber 36. Incoming fiber optic cables 108 from a cable source may enter the incoming chamber 34 through slot 38 and be terminated on the incoming surface 32a. In a like manner, fiber optic cable 116 terminated on exiting surface 32b may be routed out of the cabinet 10 through slot 44 to active equipment, such as a server.

The cabinet 10 may also be provided with a pair of slack management spools 106 that allow for spooling bulk incoming cables 108 while maintaining a minimum bend radius in the cables. Further, strain relief brackets 110, 111 may be provided to anchor ties 134, 132, respectively, to the cabinet for bundling the fiber optical cable 108, 116 that enters and exits each chamber. Other arrangements of the parts of the cabinet 10, such as the cable slots and patch panel wall, etc., are also possible.

The fiber optic wall mount cabinet 10 may also include lockable first cover 46 and second cover 48 to cover the incoming chamber 34 and exiting chamber 36, respectively. The first cover 46 may be hingedly connected to the side wall 22 such that the first cover 46 is perpendicular to the side wall 22 and substantially closes the incoming chamber 34. The second cover 48 may be hingedly connected to the back wall 30, to, when closed, form a second side wall 54 opposite to the side wall 22, and an exiting front wall 56 level with a closed first cover 46. When fully open, the second cover 48 may enable full access to the exiting chamber 36 from both the front and side of the cabinet 10. The first cover 46 and second cover 48 may also include keyed locks 50 and handles 52, located preferably on the outer edges of each cover, for providing security and accessibility, respectively, to the respective chambers 34, 36. In an alternative embodiment, each cover may be hingeless, completely removable, and releasably secured to the cabinet 10 with snaps, clips, or the like. Other arrangements are also possible.

The patch panel wall 32 may include a number of removable covers 120 that cover openings in the wall that provide access between the chambers 34, 36. Upon removal of an appropriate number of covers 120, cable connectors, or adaptors 200 may be installed on the wall 32. The surfaces 32a, 32b of the patch panel wall 32 may be configured to accept direct mounting of the adaptors 200. The patch panel wall 32 may be configured along with the adaptors 200 in a variety of orientations. The fiber optic connector adaptors 200, may serve as termination points for incoming fiber optic cables 108, terminated by connectors 122, and exiting fiber optic cables 116, terminated by connectors 60. The use of fiber optic connector adaptors 200 on the patch panel wall 32 allows for simplified detachment and reattachment of fiber optic cables 108, 116. For example, if a server is to be connected to another cable, only a connection change is required. At the incoming surface 32a, a connector 122 with a first cable may be removed and replaced by a connector 122 of a second cable. Unlike splicing which is a permanent connection, the use of fiber optic cables with connectors, along with the fiber optic connector adaptors of the patch panel wall, may simplify the process of making connection changes.

To guide the exiting cables 116, and redirect the cables from their essentially perpendicular orientation with the wall panel 32 to an essentially parallel orientation to the wall panel for exit out of the bottom wall 28, the cables may be provided with cable guides 300 that clip onto the cables adjacent the terminal ends of the cables. Cable guides 300 as discussed in more detail below, provide a support guide for changing an orientation of the cable while also determining, or limiting the bend radius of the cable to ensure that the cable does not get bent past the minimum bend radius. As previously mentioned, the bending of a fiber optic cable beyond the minimum bend radius can lead to attenuation and loss of signal within the cable.

While the embodiments in the figures and the discussion below are directed to cable guides for LC type fiber optics, the cable guides may be configured for any type of fiber optic connectors, such as, but not limited to, FC, SC, ST, MPO or MTP types of fiber optic connectors.

Figure 3A:
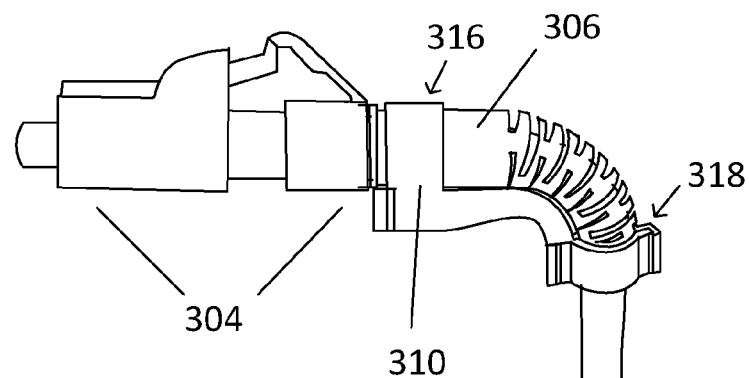
FIGS. 3A-3E provide various views of a cable guide with a 90° offset according to an embodiment.

FIG. 3A depicts an embodiment of a fiber optic cable assembly 302, having a fiber optic cable 303 with an LC type connector assembly 304 attached to an end thereof. The connector assembly 304 may be configured for being plugged into a patch panel adaptor as discussed above. The end portion of cable 303 may include a shrink-wrap, or alternative protective sleeve 305 and a cable boot 306 for providing strain relief and protecting the cable during bending. A cable guide 310 may be removably attached adjacent the end of the fiber optic cable 303 to provide for a change in direction of the cable while ensuring that the cable does not exceed its minimum bend radius. Cable guide 310 may be configured, as discussed below, to be fitted around the exterior of a cable 303, and therefore may be attached either prior to, or after the cable is installed or plugged into a connector adaptor.

Figure 10A:
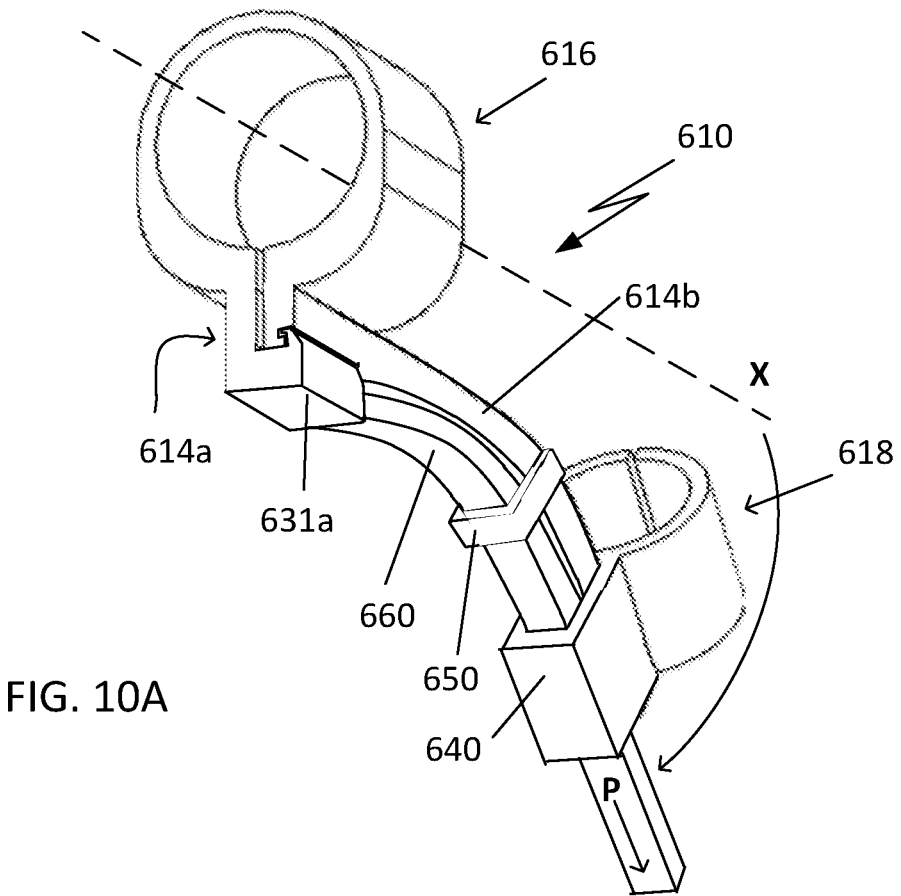
FIGS. 10A-10C depict an adjustable offset cable guide according to an embodiment.
Figure 10B:
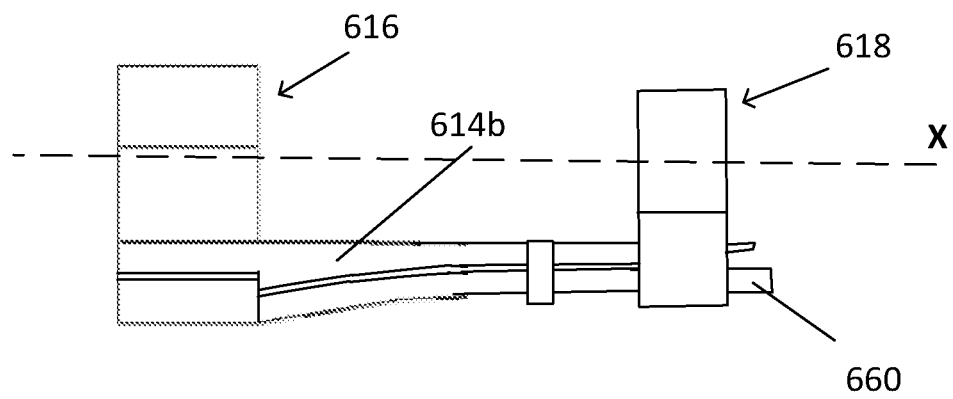
Figure 10C:
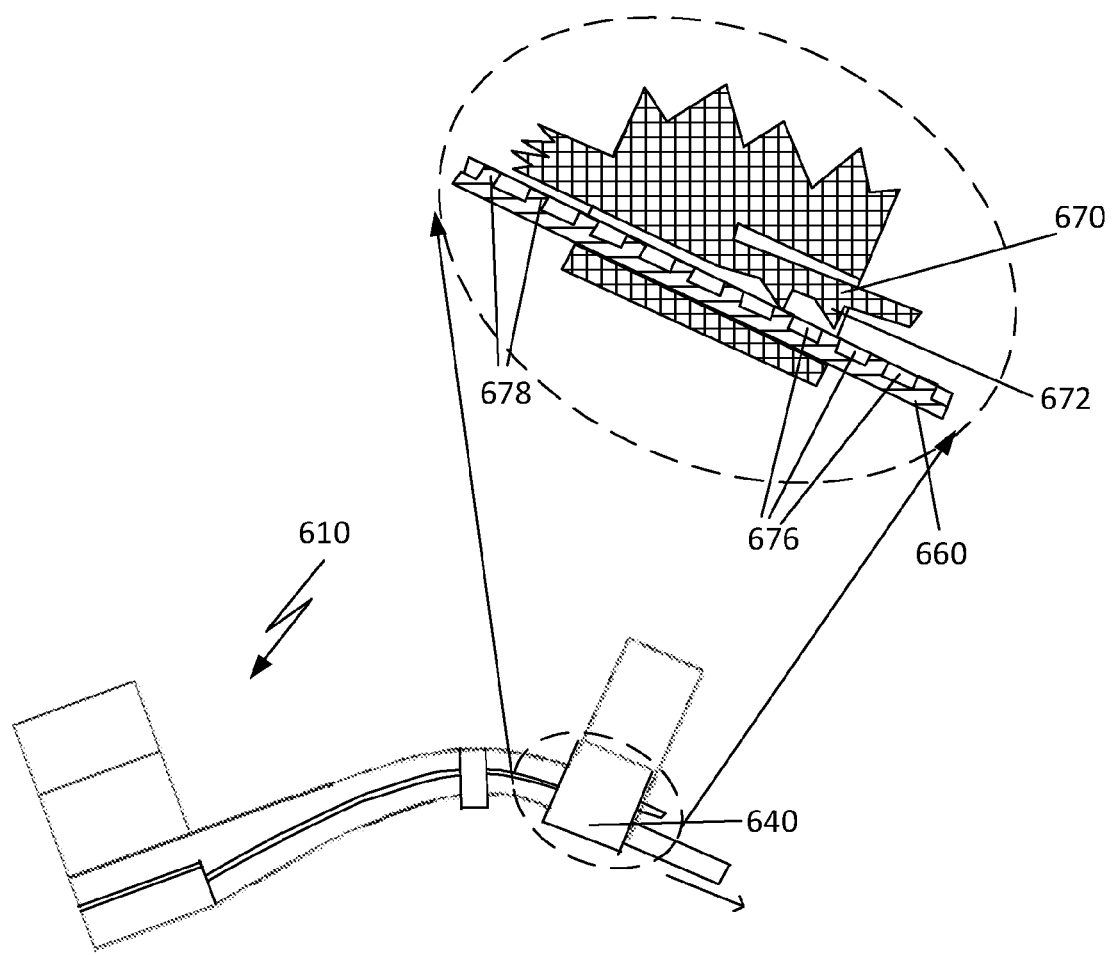

In alternative embodiments, a cable guide 310 may be configured to be installed on a cable, essentially anywhere along a cable that may require a bend in the cable. Further, while the cable guide 310 in FIGS. 3A-3E is depicted as providing a 90° offset, or bend in the longitudinal direction of the cable, cable guides in this embodiment, or any other embodiment presented herein, may provide any degree of offset, or bend, essentially from 0° (an essentially straight run cable) to 180° (a cable which loops and returns back in the opposite direction) and even beyond 180° if a situation presents in which such is necessary. As examples, a cable guide may be configured to provide a degree of offset, or bend, of approximately any of: 5°, 10°, 15°, 20°, 25°, 30°, 35°, 40°, 45°, 50°, 55°, 60°, 65°, 70°, 75°, 80°, 85°, or 90°, or any value between any of the listed values, or if needed, greater than the listed values. Embodiments as depicted in FIGS. 5A-5B and 7A-7B illustrate alternative cable guides that provide for approximately a 45° offset or bend. An alternative embodiment as depicted in FIGS. 10A-10C provides for a variably adjustable angle cable guide.

As illustrated in FIGS. 3B-3E, a cable guide 310 may have an elongated support section 314 that defines the curvature of the guide and the offset or bend radius for a cable, and at least two retaining sections 316, 318 for holding the cable in relation to the support section to retain the cable at the desired offset. As depicted in FIG. 3A and shown in greater details in FIGS. 4A and 4B, retaining section 316 in an embodiment, may be configured to fit around a portion of the cable boot 306 adjacent the terminal end of the cable 303, and the retaining section 318 may be configured to fit around the cable 303 and sleeve 305 adjacent the end of the cable boot 306.

Figure 3B:
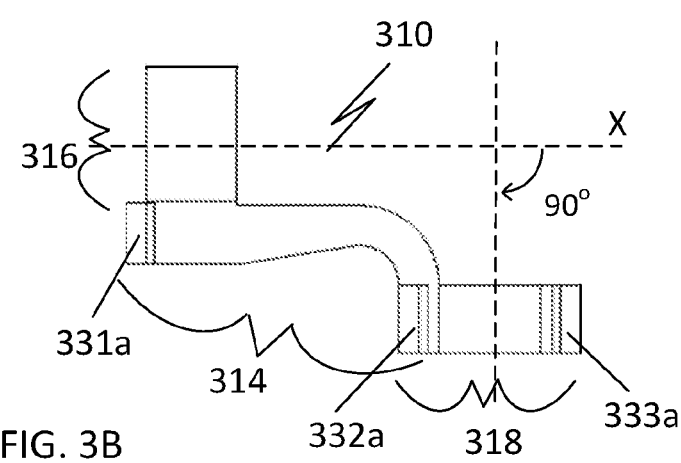
Figure 3C:
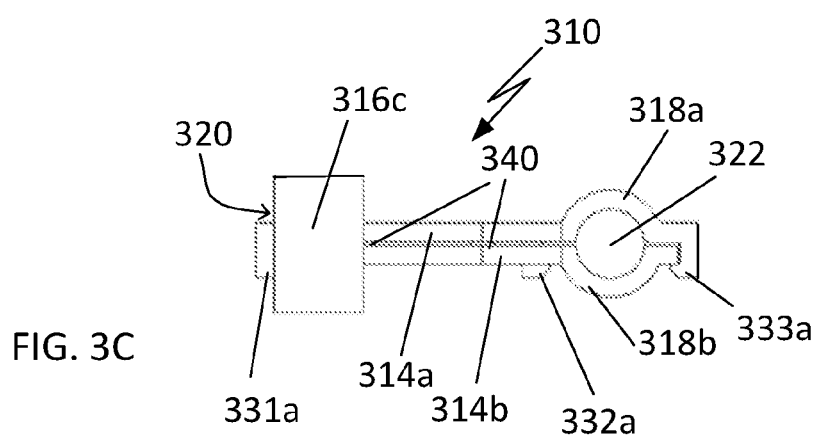
Figure 3D:
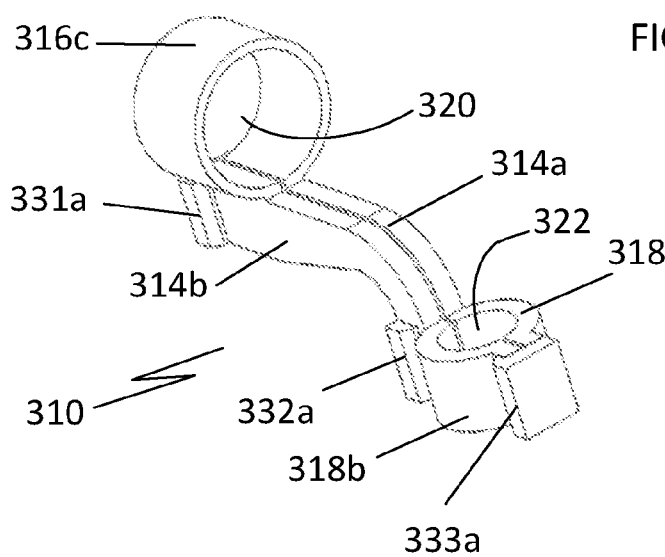
Figure 3E:
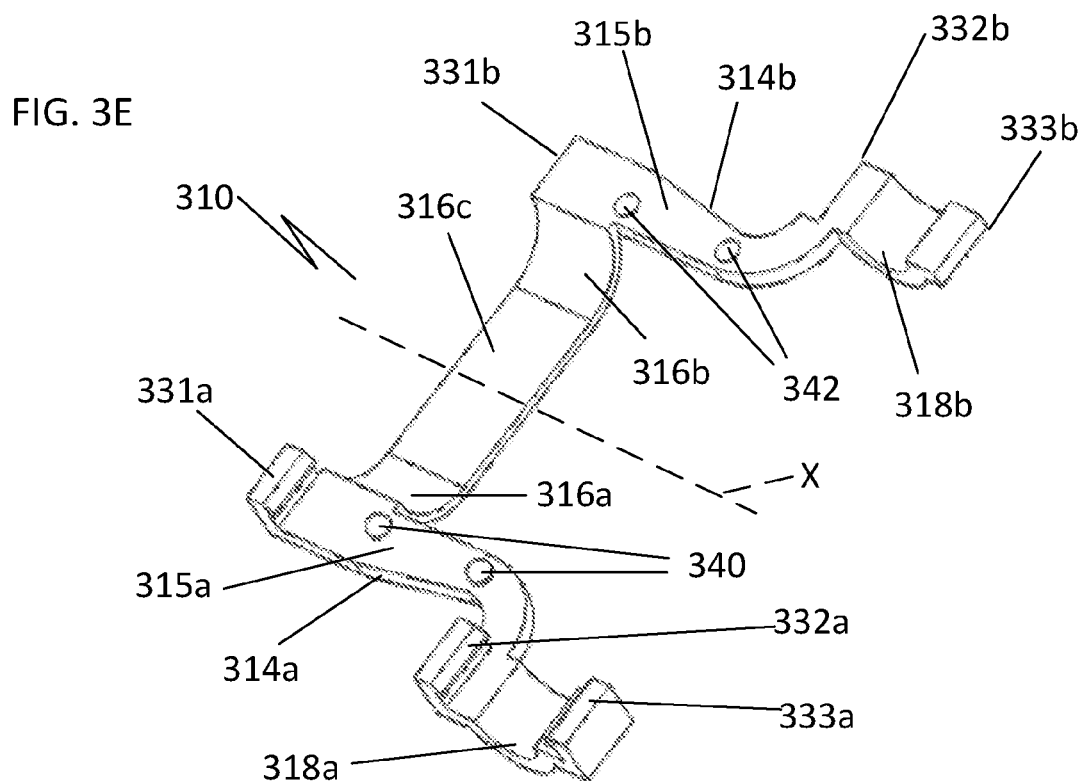

As depicted in FIG. 3E, the cable guide 310 may be formed of a single unitary piece of material. In this regard, FIG. 3E depicts an open guide 310, while FIGS. 3B-3D depict the guide folded over to form a functional cable guide. The guide 310 may include at least support section halves 314a, 314b, that, when mated, together form support section 314, retaining section portions 316a, 316b and 316c that together form retaining section 316, and retaining section halves 318a and 318b, that when mated, together form retaining portion 318. Support section halves 314a, 314b may be essentially mirror-images of one another in the longitudinal direction of the cable guide.

With such a configuration as shown in FIG. 3E, the support section halves 314a, 314b may be folded toward one another, about axis X, bending at least connecting portion 316c to mate surface 315a with surface 315b, to provide the configuration as depicted in FIG. 3D. Upon mating of surfaces 315a with surface 315b, retaining section portions 316a, 316b and 316c may form tubular retaining section 316, defining a passage 320 that is configured to receive a fiber optic cable therein. Likewise, upon mating of surfaces 315a with surface 315b, retaining section halves 318a and 318b may be mated together to form the retaining section 318, defining a passage 322 that is also configured to receive the fiber optic cable therein. As depicted, retaining section halves 318a and 318b may be half-tubular sections that when mated form an essentially full-tubular retaining member.

The guide 310 may be provided with some type of locking members configured to retain sections 314a, 314b together, as in the closed configuration of FIG. 3D. In an embodiment as shown in FIGS. 3A-3E, the locking members may be configured as clips 331a, 332a, 333a disposed on one or more of the parts, such as 314a, 314b, 318a, and/or 318b, that are configured to interlock with corresponding mating parts 331b, 332b, 333b when mated together. The clips may be configured with different configurations or be provided at alternative locations, and the number of clips provided may be more or less than three clips as shown. Additional configurations of locking mechanism as well as additional locations and variations are presented further below.

The two sections 314a, 314b may also include alignment projections 340, and corresponding recesses 342 for guiding the sections into alignment for installation and mating, and retaining the sections in alignment during use. FIG. 3E depicts the projections 340, on the section 314a, and the corresponding recesses on the section 314b. In alternative embodiments, the projections 340 may be disposed on either, or both, of the sections 314a, 314b, and the corresponding recesses may be disposed on the other of the sections, so that, upon mating, each projection fits into a corresponding recess of the opposing section.

In an embodiment, the cable guide 310 may be formed of a polymeric material. The cable guide 310 may be injection molded as a unitary part, or may be formed by other methods. The material, or materials, for cable guide 310 may therefore be pliable at least along section 316c so that the two support section halves 314a and 314b may be folded towards one another about axis X to mate the two section halves and form support section 314. In addition, the material used may have some resiliency so that the clips 331a, 332a, and 333a may engage and be disengaged from their corresponding mating parts 331b, 332b, and 333b.

Figure 4A:
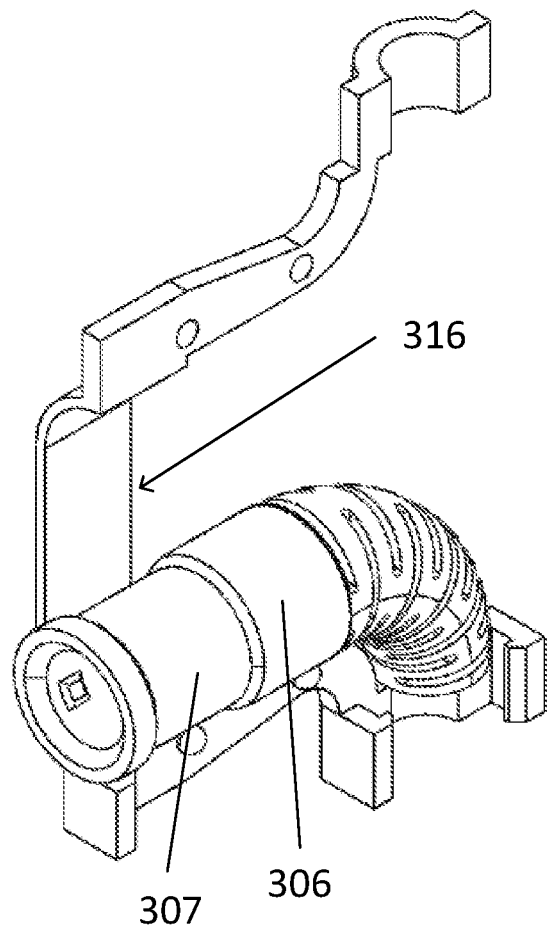
FIGS. 4A and 4B depict a cable guide before and after installation on a cable boot in accordance to an embodiment.
Figure 4B:
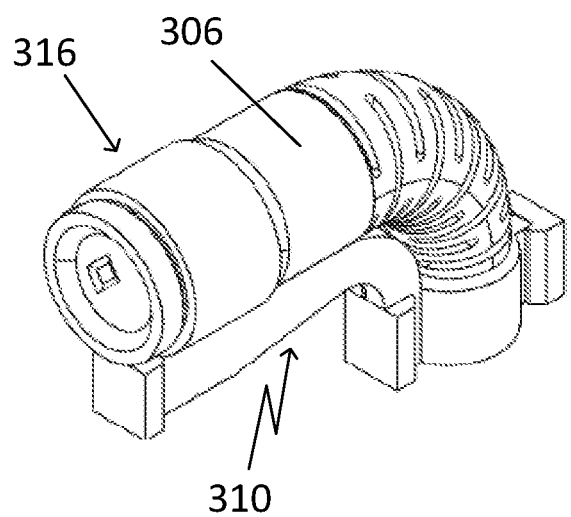

FIGS. 4A and 4B depict the installation of a cable guide 310 in relation to a cable boot 306 (fiber optic cable 303 is omitted for clarity). FIG. 4A depicts a cable boot 306 placed in relation to an open cable guide 310 for installation of the cable guide on the boot. The cable boot 306 may include a recessed portion 307 configured for receiving the band (316a, 316b and 316c) of retaining section 316 therein. FIG. 4B depicts a closed cable guide 310 disposed around the cable boot 306 with the band of retaining section 316 disposed within the recessed portion 307 to thereby inhibit sliding movement between the cable boot and the guide to prevent the boot from coming out of the guide. In an embodiment, the fit between the band and the recessed portion in a radial direction may be loose to allow for rotation of the guide 310 relative to the boot and thereby allow for a position of a cable to be moved and allow for access of possibly additional cables within an installation as discussed above.

FIGS. 5A-5B and 7A-7B represent alternative embodiments of cable guides having approximately a 45° offset for changing a fiber optic cable direction by about 45°. A cable guide 410 as represented in FIGS. 5A and 5B may also be molded as one piece in a form similar to the representation of FIG. 3E as discussed previously. The guide 410 may have two support section halves 414a and 414b that may be mated via bending a connection section 416c that is flexible and allows the halves to be folded and mated to provide a support section 414 in the configuration as shown in the drawings. In a similar manner as described above with reference to FIG. 3E, each of the support section halves 414a, 414b may correspondingly include a portion 416a, 416b that together with section 416c may form tubular retaining section 416, defining a passage 420 that is configured to receive a fiber optic cable therein. Likewise, each of the support section halves 414a, 414b may correspondingly include section halves 418a and 418b that may be mated together to form the retaining section 418, defining a passage 422 that is also configured to receive a fiber optic cable therein.

Guide 410 may also include some type of locking members configured to retain sections 414a, 414b together, as in the closed configuration of FIG. 5A. While some examples of interlocking mechanisms are disclosed, the disclosure is not meant to be limited to the examples, as various configurations of locking features may be employed. In an embodiment, while not shown, the locking members may be configured as clips, such as clips 331a, 332a, 333a discussed previously, that are configured to interlock with corresponding mating parts when mated together.

Additional types of locking members may also be used. One example of an additional interlock configuration 450, as represented by the illustration in FIG. 6 taken along line VI-VI of FIG. 5, includes displaceable projections 454 on at least one of the mating surfaces of the support section halves 414a, 414b and corresponding receiving orifices 455 on the other of the mating surfaces. An orifice 454 may have a reduced dimension opening 456, and the projections 454 may be resiliently displaceable towards one another to allow passage of the projections through the opening. Upon passage of the shoulder portions 458 through the opening 456, projection 454 may return to their original position to engage the projections within the orifice 454 as shown in FIG. 6. To release the engagement, a tool may be configured to be insertable into the orifices 455 to force the projections 454 together so they may be withdrawn back out through the opening 456. A configuration of projections 454 and orifices 456 may also guide the sections into alignment for installation and mating, and therefore any additional alignment devices, such as projections 340 in FIG. 3E, may not be needed.

Figure 7A:
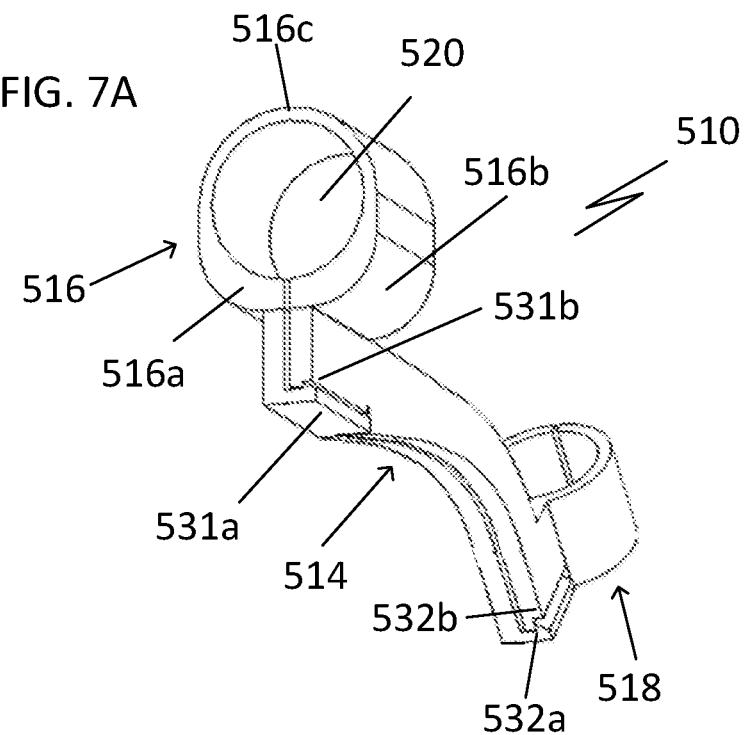
FIGS. 7A and 7B illustrate an alternative cable guide with a 45° offset according to an embodiment.
Figure 7B:
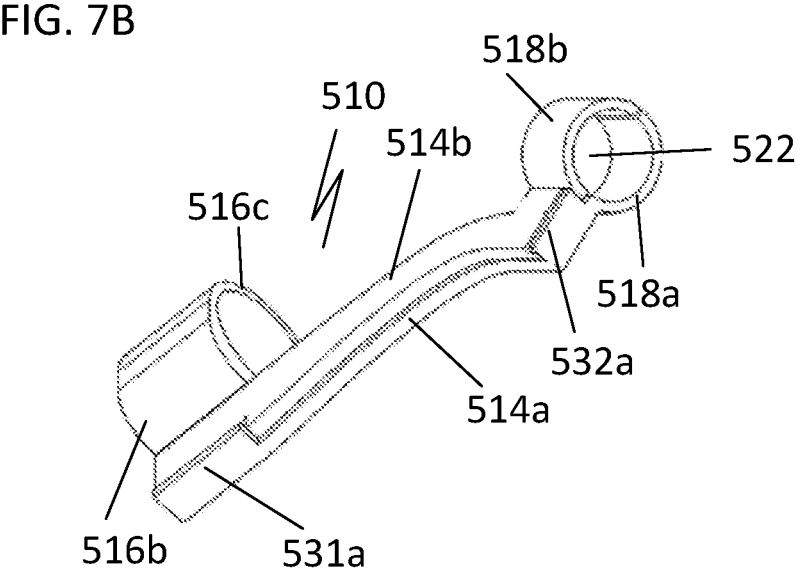

FIGS. 7A-7B represent an alternative embodiment of a 45° cable guide 510. An embodiment depicted in FIGS. 7A and 7B may have a support structure 514 that may be similar to the support section 314 as discussed above for the 90° guide in FIGS. 3A-3E. A cable guide 510 as represented in FIGS. 7A and 7B may also be molded as one piece in a form similar to the representation of FIG. 3E as discussed previously. The guide 510 may have two support section halves 514a and 514b that may be mated and connected together via a flexible connection section 516c that allows the halves to be folded and mated to provide the configuration as shown in the drawings. In a manner as described above with reference to FIG. 3E, each of the support section halves 514a, 514b may correspondingly include a portion 516a, 516b that together with section 516c may form tubular retaining section 516, defining a passage 520 that is configured to receive a fiber optic cable therein. Likewise, each of the support section halves 514a, 514b may correspondingly include section halves 518a and 518b that may be mated together to form the retaining section 518, defining a passage 522 that is also configured to receive a fiber optic cable therein.

The configuration of guide 510 in FIGS. 7A and 7B, also includes interlocking clips 531a and 532a that are configured to interlock with corresponding engagement portions 531b and 532b to retain the support section halves 514a and 51b together in a mating engagement. FIGS. 7A and 7B provide an alternative configuration for the location of the clips 531a and 532a. The number and location of interlocking members (clips/projections) may be a function of the material used to form the guides. For example, if a more rigid polymer is used to form the section halves 518a and 518b a single clip 532a, as shown in FIG. 7B, may be sufficient for retaining a fiber optic cable within the retaining section 518. On the other hand, if a more flexible polymer is used, the upper portion of the sections 518a and 518b (in FIG. 7B) may open, and an alternative clip, such as clip 333a in FIG. 3D may be needed to hold the retaining sections 518a and 518b together.

Figure 8:
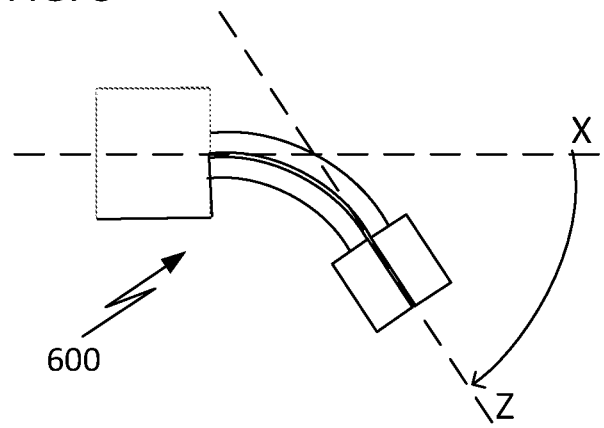
FIG. 8 illustrates an alternative cable guide with a 45° offset according to an embodiment.

For reference purposes only, with reference to FIGS. 3B and 5B, an X-direction may define a left-to-right direction of the page, a Y-direction may define a top-to-bottom direction of the page, and a Z-direction may be into-and-out-of the page. With this orientation, the angular offset provided by the corresponding cable guides 310 and 510 may be considered to be in the plane of the page, or offset in the Y-direction with respect to the X-direction. In an alternative embodiment as shown in FIG. 8, a cable guide 600 may be configured to provide an offset in the Z-direction with respect to the X-direction. In FIG. 8, an offset of about 55° is depicted. Such a Z offset may be essentially any angle as may be needed for a desired purpose. As examples, a cable guide may be configured to provide a degree of offset, or bend in the Z-direction, of approximately any of: 5°, 10°, 15°, 20°, 25°, 30°, 35°, 40°, 45°, 50°, 55°, 60°, 65°, 70°, 75°, 80°, 85°, or 90°, or any value between any of the listed values, or if needed, greater than the listed values.

Figure 9A:
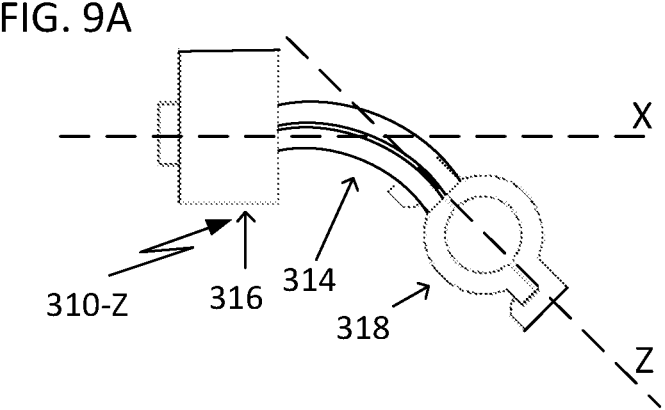
FIGS. 9A and 9B depict cable guides with compound angular offsets according to an embodiment.
Figure 9B:
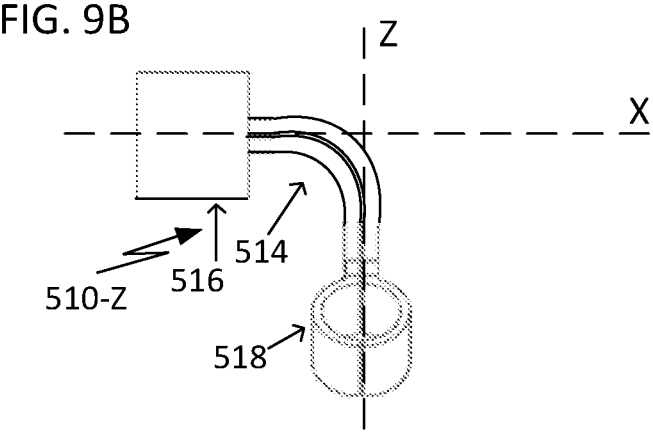

Alternatively, as shown in FIGS. 9A and 9B, an offset may be provided in both the Y-direction (in this depiction into-and-out-of the page) and the Z-direction (in this depiction, now top-to-bottom). FIG. 9A depicts a cable guide 310-Z, which has the 90° X-Y offset of the guide 310 as shown in FIG. 3B, while also providing a 45° offset in the Z-direction. Similarly, FIG. 9B depicts a cable guide 510-Z, which has the 45° X-Y offset of the guide 510 as shown in FIG. 5B, while also providing a 90° offset in the Z-direction. Such compound offsets may also be of essentially any angular orientation as may be required. For example, the offset from the X-axis in the Y direction may be anywhere from 0° to 90°, and the offset from the X-axis in the Z-direction may be from 0° to 90°. Some specific examples of offsets from the X-axis in degrees corresponding to Y and Z directions may therefore by approximately any of: 0/10; 0/20; 0/30; 0/40; 0/50; 0/60; 0/70; 0/80; 0/90; 10/0; 10/10; 10/20; 10/30; 10/40; 10/50; 10/60; 10/70; 10/80; 10/90; 20/0; 20/10; 20/20; 20/30; 20/40; 20/50; 20/60; 20/70; 20/80; 20/90; 30/0; 30/10; 30/20; 30/30; 30/40; 30/50; 30/60; 30/70; 30/80; 30/90; 40/0; 40/10; 40/20; 40/30; 40/40; 40/50; 40/60; 40/70; 40/80; 40/90; 50/0; 50/10; 50/20; 50/30; 50/40; 50/50; 50/60; 50/70; 50/80; 50/90; 60/0; 60/10; 60/20; 60/30; 60/40; 60/50; 60/60; 60/70; 60/80; 60/90; 70/0; 70/10; 70/20; 70/30; 70/40; 70/50; 70/60; 70/70; 70/80; 70/90; 80/0; 80/10; 80/20; 80/30; 80/40; 80/40; 80/60; 80/70; 80/80; 80/90; 90/0; 90/10; 90/20; 90/30; 90/40; 90/50; 90/60; 90/70; 90/80; and 90/90 and any values between any of the listed values.

In an additional embodiment, as represented by FIGS. 10A-10C, a cable guide 610 may be configured as an adjustable angle guide for providing variable offset for a cable as may be needed at an installation. With such a configuration, the cable retaining sections 616 and 618 may essentially be the same as the sections 516 and 518 as previously discussed. Similarly, support section 614 may have two mating support section halves 614a and 614b, as well as a clip 631a, that may engage with the support section 614b. As shown, clip 631a, may be integrally molded with support section 614a, and may have a J-shaped configuration to provide a stronger interlocking engagement with the support section 614b. Additional J-shaped clips 640 and 650 may also be provided, and may be integrally molded with support section half 614b (in the manner that 631a is integral with 614a), and may wrap around and engage with a slot in the other support section half 614a, such that they interlock in the same manner as clip 631a engages support section half 614b. As with the other embodiments, the guide 610 may also be molded as an integral piece.

An original configuration of the guide 610, after molding and mating section halves 614a and 614b, may be represented by the depiction of FIG. 10B, wherein the support section halves 614a and 614b may be relatively straight and extend parallel to the X-axis. To provide for an adjustable angle, guide 610 may include a strap 660 that is able to be pulled longitudinally with respect to the support section 614, in the direction P as shown in FIG. 10A. Strap 660 may be integrally molded to the clip portion 631a such that when the guide 610 is folded to mate the support section halves 614a and 614b, strap 660 will be disposed parallel to the support section 614. Each of the clips 640 and 650, when interlocked with the opposite support section, may define a space adjacent the bottom of the support section halves 614a and 614b for passage of the strap 660 therethrough. The height of the space may be approximately the same as the thickness of the strap 660. Thus, after clipping and mating the section halves 614a and 614b, strap 660 may be fed through the clips 640 and 650 to provide a configuration as shown in FIG. 10B. Alternatively, strap 660 may be placed along the support sections 614a and 614b, and clips 640 and 650 may be clipped and fastened around the strap 660.

Since strap 660 is movable longitudinally with respect to the support section 614, in the direction of the arrow P, a displacement or pulling of the strap though the clip 640 in the direction of the arrow P may cause the support section to be deflected downwardly away from the X-axis to a configuration such as shown in FIGS. 10A and 10C, for example. To hold the guide 610 in an angled position within the clip 640 adjacent the rear end of the clip, there may be provided a fastening arrangement that may include a cantilevered flexible locking armature 670. The armature 670 may include at least one saw-tooth-shaped engaging protrusion 672 (two are shown) directed towards the strap 660. A series of engaging recesses 676, separated by ridges 678 may be provided in the strap 660 at essentially equal intervals on a side of the strap disposed towards the protrusion teeth 672. Upon pulling the strap 660 through the clip 640, the ridges 678 may displace the teeth 672 out of the recesses 676 to allow the strap to be pulled though the clip. Upon release of the pulling tension, the support sections 614a and 614b will want to return to their original non-bent configuration, thereby pulling the strap 660 in the opposite direction wherein the teeth 672 will move back into the recesses 676 and will engage with the ridges 678 to hold the strap in position within the clip 640, to hold the clip in an angled configuration as shown in FIG. 10C.

For release of the strap 660, the armature 670 may also include a manual release tab 684 that may be manually displaceable to move the teeth 672 out of engagement with the ridges 678.

In the previous embodiments the cable guides include a support section that is disposed within radius of curvature of an installed cable. In an alternative embodiment as depicted in FIGS. 11A and 11B, a cable guide 710 may include a support section 714 that is external to the radius of curvature of an installed cable 703 and cable boot 706. Support section 714 may be formed from two substantially mirror image halves (similar to the support sections of the previous embodiments), or alternatively, as shown, may have a portion 714a that forms a substantial part of the support section, and a portion 714b fits into a corresponding slot in portion 714a. Guide 710 may also include some type of locking members configured to retain sections 714a, 714b together. As in previous embodiments, the locking members may be configured as clips, such as clips 331a, 332a as in FIG. 3E, or projections 454 as in FIG. 6. A flexible retention band 716 may extend between the support sections 714a, 714b and be configured to fit around a portion of the cable boot to pull the cable into the curvature of the support section 714.

Such a guide 710 may include retention flanges 717a, 717b at the ends thereof that are half-tubular in shape. Flanges 717a may be configured to fit into the recessed portion 707 of the boot 706 and together may fit around about half of the circumference of the boot in the recessed portion. Flanges 717b may be configured to be disposed adjacent an end of the cable boot 706. and together may fit around about half of the circumference of the cable 703. Flanges 717a, 717b may extend further than about half of the circumference as shown in FIG. 11C (taken along view XI-XI in FIG. 11A), and form an opening that is less than the circumference of the boot or cable respectively, so that the boot or cable deflect the flanges outwardly upon installation, whereby the boot or cable may then be held within the flanges.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic cable guide comprising:
   an elongate support member for being disposed in a longitudinal direction of a fiber optic cable and configured for providing a radius of curvature to the fiber optic cable for changing a direction of the fiber optic cable,
   wherein the support member has a first end and a second end spaced apart longitudinally from the first end, the first end of the support member defining a first longitudinal axis, and at least a portion of the elongate support member being flexible between the first end and the second end; and
   a strap disposed longitudinally along the support member and having a first strap end fixedly attached adjacent the first end of the support member, and a second strap end disposed adjacent the second end of the support member, the strap being configured to be pulled longitudinally with respect to the support member for bending the support member to variably offset and retain the second end at an angle with respect to the first longitudinal axis.

2. The fiber optic cable guide of claim 1, further comprising:
   a band having both a first end and a second end connected with the support member and configured to be disposed around the fiber optic cable to fasten the fiber optic cable to the support member;
   wherein the elongate support member comprises a first body portion interconnectable with a second body portion;
   the first end of the band is connected to the first body portion;
   the second end of the band is connected to the second body portion; and
   the band comprises a flexible band disposed between and connecting the first body portion to the second body portion, the flexible band being configured for being wrapped around the fiber optic cable to position the first body portion adjacent the second body portion for interconnection of the first body portion with the second body portion.

3. The fiber optic cable guide of claim 2, wherein the first body portion, the second body portion and the flexible band are integrally formed.

4. The fiber optic cable guide of claim 2, wherein at least one of the first body portion and the second body portion comprises at least one interlocking element for releasably interconnecting the first body portion with the second body portion.

5. The fiber optic cable guide of claim 2, wherein:
   the first body portion and the second body portion comprise longitudinal, substantially mirror image halves of the support member.

6. The fiber optic cable guide of claim 2, wherein:
   each of the first body portion and the second body portion comprises a mating surface to be mated with the mating surface of the other of the first body portion and the second body portion to form the support member;
   at least one of the first body portion and the second body portion comprises at least one interlocking element for releasably interconnecting the first body portion with the second body portion to retain the mating surfaces together; and
   the flexible band is configured to be disposed around the fiber optic cable upon mating of the mating surfaces to fasten the fiber optic cable to the support member.

7. The fiber optic cable guide of claim 6, wherein
each of the first body portion and the second body portion have a first end and a second end spaced apart from the first end with the mating surface between the first and second ends;
the flexible band is integral with the first end of each of the first body portion and the second body portion for forming a first tubular retaining member for being disposed around a first portion of the fiber optic cable to fasten the first portion of the fiber optic cable to the support member; and
at least one of: the second end of the first body portion and the second end of the second body portion, comprises at least a portion of a second retaining member for being disposed around at least a portion of a second portion of the fiber optic cable spaced apart from the first portion of the fiber optic cable to fasten the second portion of the fiber optic cable to the support member.

8. The fiber optic cable guide of claim 7, wherein the second end of the first body portion comprises a first half-tubular member, and the second end of the second body portion comprises a second half-tubular member, wherein the first half-tubular member and the second half-tubular member are configured to form a full tubular member as the second retaining member upon mating of the mating surfaces of the first body portion and the second body portion.

9. The fiber optic cable guide of claim 8, wherein:
the first tubular retaining member defines a first axis;
the second tubular retaining member defines a second axis at an angle with respect to the first axis; and
the support member defines a radius of curvature between the first tubular retaining member and the second tubular retaining member, with the radius of curvature being greater than a minimum radius of curvature of the fiber optic cable to be curved by the fiber optic cable guide.

10. The fiber optic cable guide of claim 9, wherein the at least one interlocking element comprises at least:
a first interlocking element disposed adjacent the first end of the first and second body portions; and
at least one second interlocking element disposed adjacent the second end of the first and second body portions.

11. The fiber optic cable guide of claim 10, wherein:
the first half-tubular member has a first longitudinal edge at the second end of the first body portion and a second longitudinal edge away from the second end of the first body portion;
the second half-tubular member has a first longitudinal edge at the second end of the second body portion and a second longitudinal edge away from the second end of the second body portion;
the first interlocking element comprises a first clip disposed adjacent the first end of one of the first body portion and the second body portion and configured for releasably engaging the first end of the other of the first body portion and the second body portion; and
the at least one second interlocking element comprises:
a second clip disposed adjacent the second end of one of the first body portion and the second body portion and configured for releasably engaging the second end of the other of the first body portion and the second body portion; and
a third clip disposed adjacent the second longitudinal edge of one of the first half-tube member and the second half-tubular member and configured for releasably engaging the second longitudinal edge of the other of the first half-tube member and the second half-tubular member.

12. The fiber optic cable guide of claim 11, wherein a fiber optic cable has a terminal end for being connected to a cable connector, the terminal end comprising a cable boot disposed around the fiber optic cable and having a first end disposed adjacent the terminal end of the fiber optic cable and a second end a distance away from the first end, the first end of the cable boot comprising a recessed channel for receiving the flexible band of the first tubular retaining member therein, and
the first tubular retaining member is configured for being disposed around the first end of the cable boot of the fiber optic cable in the recessed channel of the cable boot;
the second tubular retaining member is configured for being disposed around the fiber optic cable adjacent the second end of the cable boot;
the angle of the first axis with respect to the second axis is about 0° to about 90°, and
the first body portion, the second body portion, the flexible band, the first and second half-tubular members, and the first, second and third clips are integrally molded as a unitary part.

13. The fiber optic cable guide of claim 1, wherein:
the first end of the support member comprises a band for holding the fiber optic cable; and
the second end of the support member comprises a retention member for holding the fiber optic cable.

14. The fiber optic cable guide of claim 13, wherein the strap is a releasable adjustment device comprising a plurality of engaging members disposed along a longitudinal axis of the strap.

15. The fiber optic cable guide of claim 14, further comprising:
a fastening arrangement disposed adjacent the second end of the support member for securing the strap adjacent the second end of the support member, the fastening arrangement comprising a housing defining a slot for passage of the strap therethrough, the slot having a height substantially equal to a thickness of the band, and the slot including a flexible deflecting member having at least one protrusion extending into the slot and being engageable with the plurality of engaging members of the strap to cooperatively lock the strap in the slot, wherein movement of the strap through the fastening arrangement causes the support member to bend to variably offset the second end at the angle with respect to the first longitudinal axis.

16. The fiber optic cable guide of claim 15, wherein the flexible deflecting member and the at least one protrusion are configured to deflect away from the strap upon insertion of the strap into and through the slot in a first insertion direction, and engage with the plurality of engaging members to inhibit movement of the strap in a second direction opposite the insertion direction.

17. The fiber optic cable guide of claim 16, wherein:
the support member defines a longitudinal axis between the first end and the second end;
the support member comprises a first body portion interconnectable with a second body portion;
the first body portion and the second body portion comprise longitudinal, substantially mirror image halves of the support member;
the band has a first end connected to the first body portion and a second end connected to the second body portion;

the band comprises a flexible band disposed between and connecting the first body portion to the second body portion, and the flexible band is configured for being wrapped around the fiber optic cable to position the first body portion adjacent the second body portion for interconnection of the first body portion with the second body portion; and at least one of the first body portion and the second body portion comprises at least one interlocking element for releasably interconnecting the first body portion with the second body portion.

18. The fiber optic cable guide of claim 17, wherein the first body portion, the second body portion, the band, the strap, and the fastening arrangement are integral parts.

19. A fiber optic cable guide comprising:

an elongate support member for being disposed in a longitudinal direction of a fiber optic cable and configured for providing a radius of curvature to the fiber optic cable for changing a direction of the fiber optic cable, the elongate support member comprises a first body portion and a second body portion interconnectable with the first body portion;

a flexible band having a first end connected with the first body portion and a second end connected with the second body portion, the flexible band being configured for being wrapped around the fiber optic cable to position the first body portion adjacent the second body portion for interconnection of the first body portion with the second body portion; and a strap disposed longitudinally along the support member and configured to be pulled longitudinally with respect to the support member for bending the support member.

20. The fiber optic cable guide of claim 19, wherein:

the support member has a first end and a second end and a longitudinal direction extending between the first end and the second end;

wherein the first end of the support member comprises the flexible band for holding the fiber optic cable, and the second end of the support member comprises a retention member for holding the fiber optic cable.

\* \* \* \* \*